June 24, 1947. W. H. LEWIS 2,422,792
CARRIAGE MEANS FOR ROAD VEHICLES
Original Filed Aug. 2, 1940 2 Sheets-Sheet 2

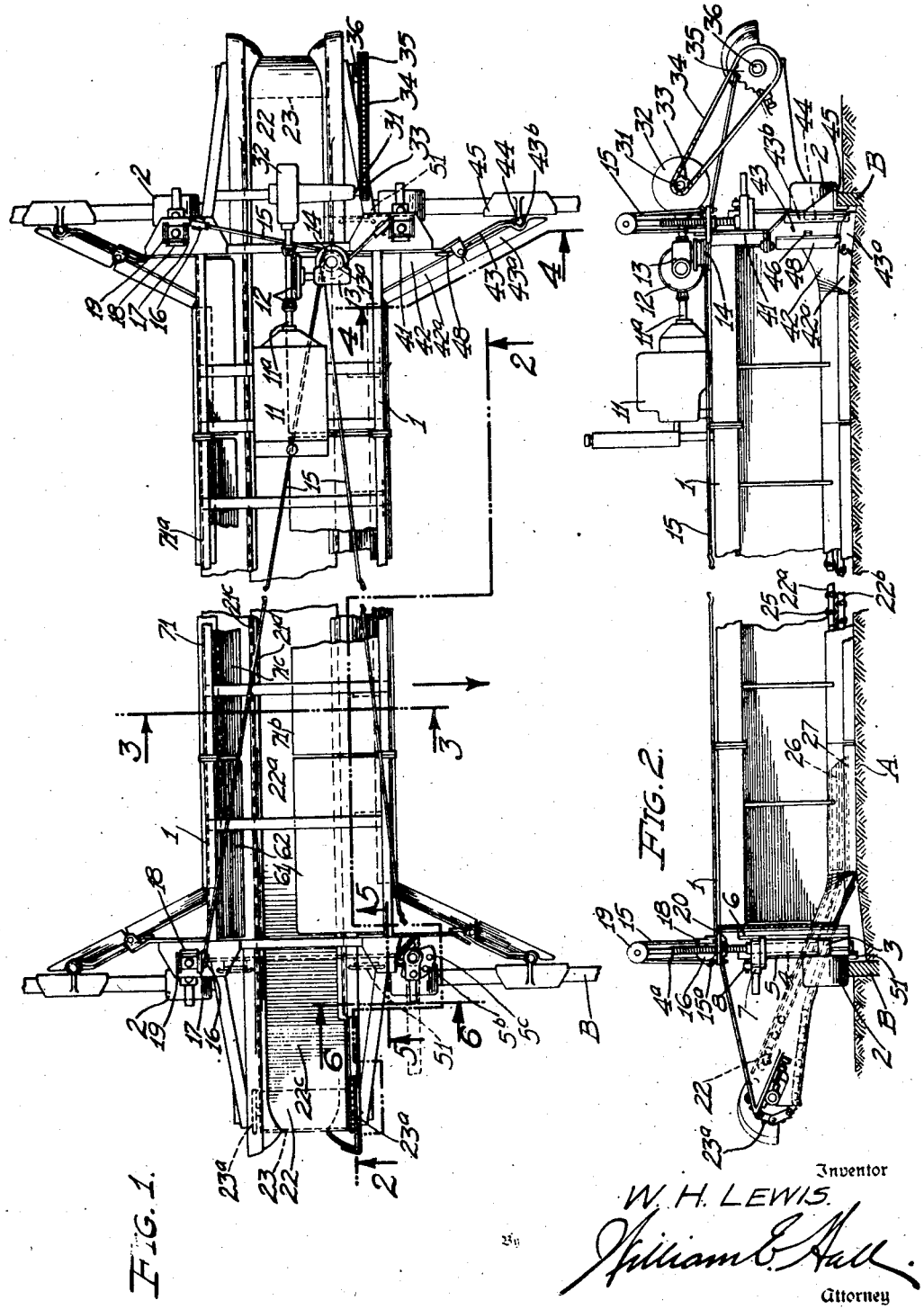

Inventor
W. H. LEWIS.
By William E. Hall
Attorney

Patented June 24, 1947

2,422,792

UNITED STATES PATENT OFFICE 2,422,792

CARRIAGE MEANS FOR ROAD VEHICLES

William Hurst Lewis, Los Angeles, Calif.

Original application August 2, 1940, Serial No. 349,465. Divided and this application October 4, 1941, Serial No. 413,611

9 Claims. (Cl. 280—6)

My present invention relates to adjustable carriage means for road vehicles, and to means which is particularly applicable to road building machinery.

This application is a division of application Serial No. 349,465, filed Aug. 2, 1940, for Subgraders, now Patent No. 2,345,612, issued April 4, 1944.

One of the principal objects of this invention is to provide a novel carriage for road vehicles, or road building machinery, whereby the supporting wheels may be shifted about vertical axes so that the vehicles, or machinery, may be drawn or conveyed in any desired direction, that is, in any angular direction to the normal course or to the longitudinal axis of the particular vehicle or machine.

Another object of this invention is to provide a carriage means of this class whereby the vehicle, or machine mounted thereon, may be quickly and easily adjusted or raised with respect to the carriage, so as to permit the vehicle or machine to straddle or be raised or moved over roadside forms, or other obstructions, for readily transporting the machine from place to place.

An important object also is to provide efficient means for simultaneously raising all portions of the vehicle or machine above or with respect to the supporting carriage, or each of the supporting wheels.

With these and other objects in view, as will appear hereinafter, I have devised a carriage means, for road vehicles, having certain novel features of construction, combination, and arrangement of parts and portions, as will be hereinafter described in detail, and particularly set forth in the appended claims, reference being had to the accompanying drawings and to the characters of reference thereon, which form a part of this applicattion, in which:

Fig. 1 is a plan view of a subgrader, for the construction of roads, embodying my novel carriage means, and showing the subgrader in a grading position on a roadway;

Fig. 2 is a front elevational view thereof in position on a roadway, shown in profile;

Figure 3:
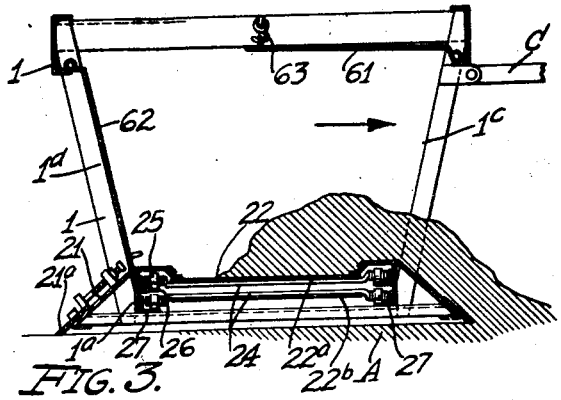
Fig. 3 is an enlarged transverse sectional view thereof, taken through 3—3 of Fig. 1.
Figure 5:
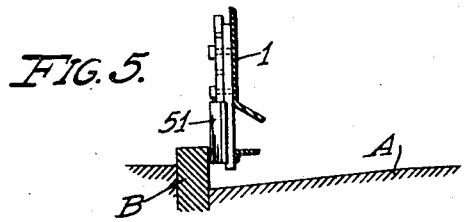
Fig. 5 is an enlarged fragmentary sectional elevation, taken at 5—5 of Fig. 1, showing the guide shoe at one side of the subgrader.
Figure 6:
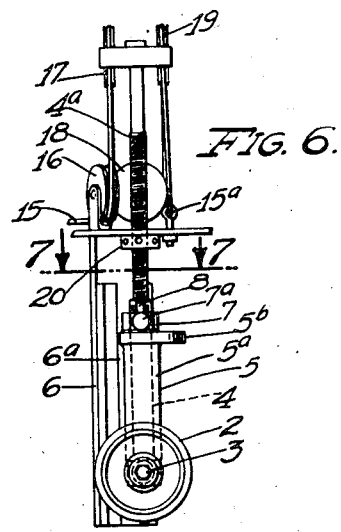
Fig. 6 is an enlarged elevation, taken at 6—6 of Fig. 1, showing the adjustable mounting of the frame on one of the wheels.
Figure 4:
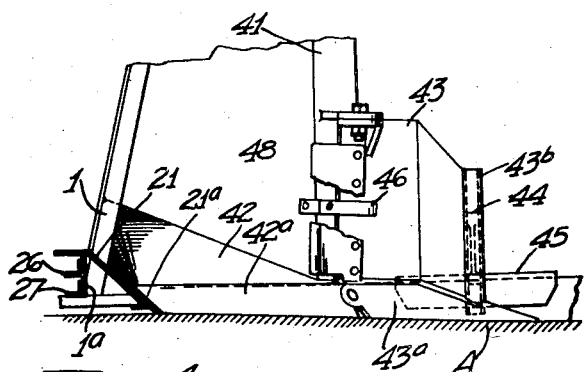
Fig. 4 is an enlarged sectional elevation, taken at 4—4 of Fig. 1, showing the construction of the deflector blades and pivoted wings.
Figure 7:
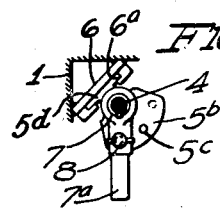
Fig. 7 is a sectional view thereof, taken through 7—7 of Fig. 6.

One of the principal novel features of this invention is the construction of a vehicle, and particularly a road machine, which may be drawn as effectively in either of opposite direction on a roadway, which may be conveniently drawn in any angular direction with respect to its longitudinal axis, and also a structure in which the vehicle body or machine itself may be raised or lowered with respect to the supporting wheels or carriage. These several features of my invention are embodied in a road construction machine, known as a subgrader, and my invention may be best understood by illustrating and describing the same in connection with such subgrader.

The frame 1 of my subgrader is relatively narrow and long, and is constructed preferably to span the ordinary roadway. The roads, designated A, under construction are usually lined or bounded by side forms of header boards, designated B in the drawings. One or both sides of the strip of the road, under construction, may be bounded by finished slabs of the road, which serve the same purpose as the side forms. The frame is carried at its opposite ends on wheels 2 which are adapted to rest on the side forms or finished slabs.

The wheels 2 may be flat and rubber-bound, and they are revolubly mounted on horizontal axles 3 which extend laterally from the lower ends of cylindrical supporting columns 4 carried by the frame 1. The columns are rotatably mounted in cylindrical sleeve portions 5ª of wheel supporting slides 5, the inner ends of the axles being secured to the lower ends of the sleeve portions 5ª. The slides 5 are provided with T-shaped portions 5ᵈ which are vertically slidable in T-channels 6ª in members 6, which are positioned angularly at the four corners of the frame 1. On each supporting column 4 is secured a collar 7 which is seated against the upper end of the sleeve portion 5ª and is provided with a radial arm 7ª for manually turning the supporting column 4 about its axis. The supporting column 4 is locked in non-rotatable relation with the sleeve portion 5ª of the slide by means of a pin 8, which may extend through registering holes in the collar 7 and a lateral flange 5ᵇ at the upper end of the sleeve 5ª.

The supporting columns 4 preferably extend above the frame and are provided at the upper ends with means for raising or lowering the frame with respect thereto. Such means is shown in the drawings as a cable-lifting or a block-and-tackle means, which is operated by a power plant or motor 11, carried on top and near one end of the frame 1. On the drive shaft 11ᵃ of the motor is slidably mounted a reversible clutch 12 which is adapted to drive a worm gear mechanism 13, which is also located at one side of the frame. Co-axial with the gear 13ᵃ of the worm gear mechanism is a drum 14, which may be divided, and upon which may be wound four cables 15. Each of these cables extends preferably around a sheave 16 mounted on the frame adjacent the upwardly extending portion of the column 4, around a sheave 17 at the upper end of the supporting column, around a sheave 18, carried on the frame 1, another sheave 19 on the upper end of the column 4, and is then secured at its end to the frame 1, as indicated by 15ᵃ. In this manner, rotation of the drum 14 simultaneously raises the frame with respect to all of the supporting columns 4, and by a minimum of power.

The supporting column 4 is provided intermediate the collar 7, and the upper end of the column with a screw 4ᵃ, on which is mounted a screw collar 20. When the frame is raised to the desired position with respect to the supporting columns 4, the screw collars 20 are screwed upwardly until the frame rests thereon, thus holding the frame in its raised position. These screw collars may also be screwed manually on the screws 4ᵃ for manually raising any desired part of the frame with respect to the respective supporting wheels, and thus relative to the header boards, upon which the wheels rest.

From the above, it is apparent that the axes of the wheels may be shifted from positions perpendicular to the longitudinal travel of the frame, to positions at right angles to their normal positions, or to any intermediate angles. These positions are determined by the positions of the pins 8 in the holes 5ᶜ of the flange 5ᵇ. If the axes of the wheels are located at right angles to their normal operative positions, that is, parallel to the longitudinal travel of the machine, the machine may be drawn cross-wise. Since the fore and aft dimension of the machine is relatively narrow, the machine may be drawn easily over the ordinary highway when the wheels are placed as last described. By inserting the pins 8 in intermediate holes, the machine may be drawn at an acute angle to its normal direction of travel.

It will be here noted that if the subgrader is to be moved in its normal course, with the wheels 2 resting on the header boards B, this is done by any suitable means, such as a conventional tractor (not shown), which may be connected to the subgrader by any suitable means, as for example, by the draw bar C.

At the front and rear, that is, the long sides of the frame, are positioned grading blades 21, which are parallel to the frame and so positioned that their outer cutting edges may be adjusted with respect to the frame to positions above and below the traction portions of the wheels, or in this instance, the upper edges of the header boards. These grading blades are inclined gradually upwardly and backwardly from their cutting edges. The cutting portions of the blades are indicated by 21ᵃ.

At the middle and lower portion of the frame 1, and between the grading blades 21, is a conveyor belt 22, which extends around drums 23 at the opposite lateral ends of the frame, both of said drums being positioned beyond the ends of the frame. The belt 22 has secured to the inner side of it a multiplicity of closely spaced carriages, consisting of transverse straps 24 having rollers 25 mounted on the ends thereof beyond the edges of the belt. Each of the drums 23 have at its opposite ends sprockets 23ᵃ which receive the rollers 15 for moving the conveyor belt.

The portions of the upper and lower stretches of the conveyor belt, that is, the portions between the operating sprockets, as indicated by 22ᵃ and 22ᵇ, are horizontal or flat and are located between the inner edges of the grading blades. The rollers 25, at the edges of the belt, ride upon vertically spaced tracks 26 and 27 located below the inner edge portions of the grading blades. The rails at each side of the tracks are secured to and extend inwardly from vertical walls 1ᵃ at the lower portions of the frame.

The opposite ends of horizontal portion 22ᵃ of the upper stretch of the conveyor belt 22 extend upwardly at a gradual angle, as indicated by 22ᶜ, over the drums 23.

The motor or engine 11 is also employed to operate the conveyor belt in either direction. The shaft 11ᵃ of the engine is connected to a shaft 31 by a reversing transmission 32. The shaft 31 has a sprocket 33 which is connected, by a chain 34, to a sprocket 35 on the shaft 36, on which one of the drums 23 is mounted.

At the opposite ends of the frame, and at the forward and rear sides thereof, are deflector members 41, at the lower portions of which are deflector blades 42 and 43, which diverge outwardly toward the front and rear of the subgrader. These deflector blades respectively have adjustable cutting edge portions 42ᵃ and 43ᵃ.

The deflector members or wings 43 are pivoted at their rear edges on and with respect to the forward edges of the members 42. At the free edges of the pivoted deflector wings 43 are vertical sockets 43ᵇ, in which slide freely the shoe supports 44, from the lower ends of which depend deflector limiting shoes 45. These shoes are of angular cross-section and are adapted to be held against the upper and inner sides of the side form or header boards. The shoes are resiliently held against the inner sides of the form boards by springs 46.

The inner edges of the deflector wings may overlap and be positioned in front of the outer edges of the deflector-walls, but there is preferably provided a vertical strip 48 of rubber belting at the inner edge of the wing which extends backwardly over the forward portion of the deflecting wall 41.

To prevent appreciable lateral movement of the subgrader, when riding upon the header boards, I have provided guide shoes 51 which are carried by the frame and may be located between the wheels.

It will be noted that the grading blades are all raised above the traction portion of the wheels 2 when the subgrader is transported from place to place, but they may be lowered to any desired position below the upper edges of the header boards, as described above.

The long sides of the frame, that is, the front and rear sides, have openings 1ᶜ and 1ᵈ. Each of these openings may be closed by gates or by a series of gates 61 and 62, which are pivoted at one edge at the upper sides of the openings. When the subgrader is drawn in the direction of the arrow of Fig. 3, the gates 61 are raised and held in such positions, while the gates 62 are lowered against the upper portion of the grading blades at the rear of the subgrader. Either of the gates may be held in raised positions by hooks 63. Thus, material may enter the interior of the frame over the forward grading blade.

The machine may be constructed to accommodate roads of different widths. For this reason, the motor or engine, as well as the connected transmission mechanism for operating the conveyor belt or the frame raising means, is located at one side of the frame. This middle unit, of various lengths, is designated 71 and consists of a frame 71a, similar to frame 1, and is provided with gates 71b and 71c, similar to gates 61 and 62, and is also provided with the necessary grading blades, tracks, and the like.

From the foregoing it is obvious that the carriage means of this invention may be applied to various vehicles for the purposes intended, and that it is also applicable to large road construction machinery, one of which has been specifically described in the specification and illustrated in the drawings. And, though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a machine of the class described, a frame, a plurality of supporting wheel carriages connected on vertical axes to the frame, said carriages having supporting wheels mounted on horizontal axes, manual lever means for separately shifting said carriages about their vertical axes to predetermined angular positions, and means for positively securing the carriages in said shifted positions.

2. In a machine of the class described, a frame, a plurality of supporting wheel carriages upon which the frame is adjustably mounted in a vertical direction, unitary means for raising and lowering the frame with respect to the wheel carriage, and screw-jack means for securing the frame in vertical adjusted positions with respect to each of the wheel carriages, said screw-jack means also separately vertically adjusting the wheel carriages with respect to the frame.

3. In a machine of the class described, a frame, a plurality of slides mounted to slide vertically on the frame, a plurality of wheel carriages rotatably mounted on vertical axes on said slides, manual lever means for separately rotating the carriages about their vertical axes with respect to the slides, and lever means for locking the carriages in said shifted positions with respect to the slides.

4. In a machine of the class described, a frame, a plurality of slides mounted to slide vertically with respect to the frame, a plurality of wheel carriages rotatably mounted on vertical axes on said slides, means for rotating the carriages with respect to the slides, means for locking the carriages in said shifted positions with respect to the slides, unitary means for simultaneously raising the frame with respect to all of the slides, and means for separately securing the frame in adjusted positions with respect to each of the slides, and also for separately vertically adjusting the slides with respect to the frame.

5. In a machine of the class described, a frame, a plurality of supporting wheel carriages connected on vertical axes to the frame, said carriages having supporting wheels mounted on horizontal axes, separate means at the upper portions of the carriages for separately shifting said carriages about their vertical axes to predetermined angular positions, and means for positively securing the carriages in said shifted positions.

6. In a machine of the class described, a frame, a plurality of supporting wheel carriages upon which the frame is adjustably mounted in a vertical direction, unitary means for raising and lowering the frame with respect to the wheel carriages, and means for separately securing the frame in adjusted positions with respect to each of the carriages, the latter means being capable also of separately vertically adjusting the carriages with respect to the frame.

7. In a machine of the class described, a frame, a plurality of supporting wheel carriages upon which the frame is adjustably mounted in a vertical direction, means for raising and lowering the frame with respect to the wheel carriages in such a manner that the lower portion of the frame may be supported by the wheels of the carriages either above or below the lower supporting portion of the wheels, and other means for separately vertically adjusting each of the carriages with respect to the frame.

8. In a machine of the class described, a frame, a plurality of slides mounted to slide vertically with respect to the frame, a plurality of wheel carriages mounted on vertical axes on said slides, said carriages having fixed upperly extending jack screws, means for separately rotating the carriages about their vertical axes with respect to the slides, means on and cooperating with the screws for raising and lowering the carriages and slides with respect to the frame, and means for locking the carriages in said angularly shifted positions about their vertical axes with respect to the slides.

9. In a machine of the class described, a frame, a plurality of slides mounted to slide vertically with respect to the frame, a plurality of wheel carriages mounted on vertical axes on said slides, said carriages having fixed upperly extending jack screws, means for separately rotating the carriages about their vertical axes with respect to the slides, means on and cooperating with the screws for raising and lowering the carriages and slides with respect to the frame, and unitary means at the upper ends of the jack screws for simultaneously moving all of said carriages vertically with respect to said frame.

WILLIAM HURST LEWIS.

REFERENCES CITED

The following references are of record in the file of this patent:

UNITED STATES PATENTS

| Number | Name | Date |
|---|---|---|
| 1,804,887 | Miller | May 12, 1931 |
| 1,117,836 | Griffith | Nov. 17, 1914 |
| Re. 16,864 | Perin | Jan. 31, 1928 |
| 1,884,636 | Faus | Oct. 25, 1932 |
| 1,113,063 | Spencer | Oct. 6, 1914 |